May 31, 1960 J. E. MACK ET AL 2,938,385
THERMISTOR THERMOMETER SYSTEM
Filed June 23, 1955 2 Sheets-Sheet 1
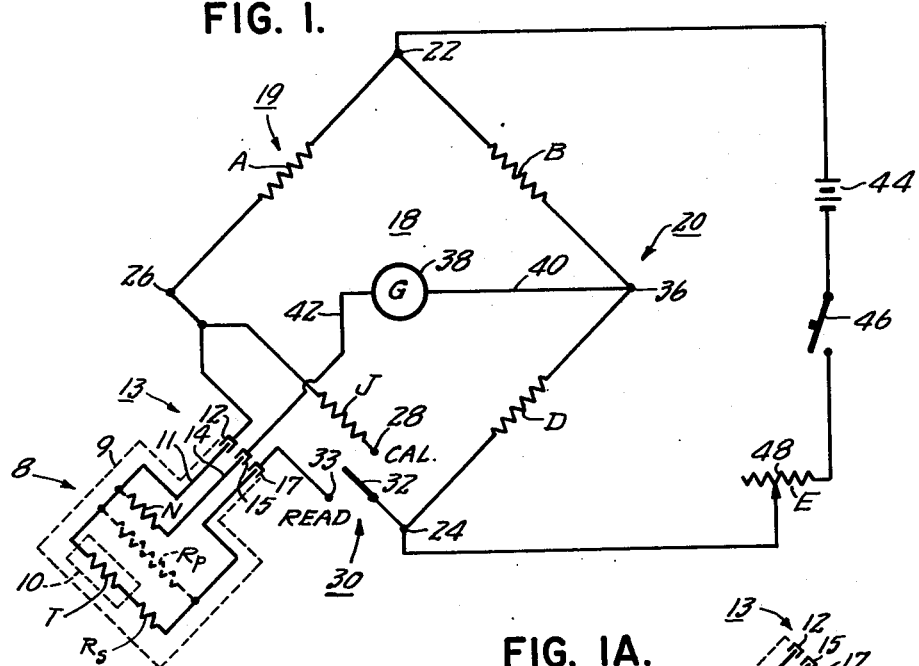
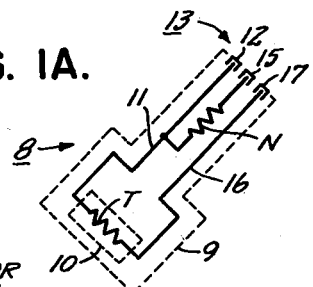
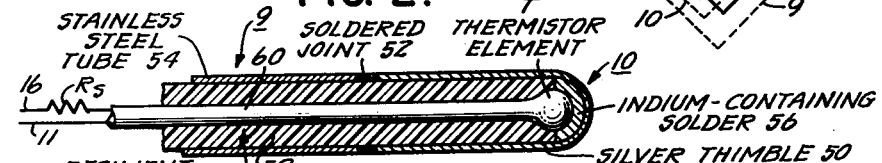
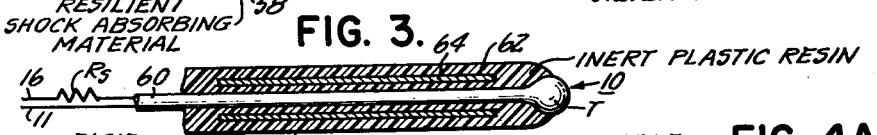
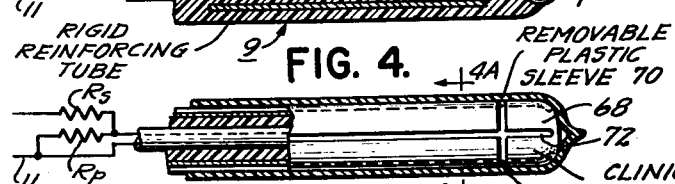
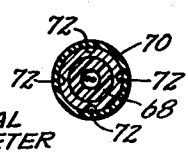
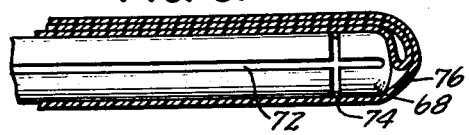
INVENTORS
JULIAN ELLIS MACK
GEORGE W. STREANDER
BY
Curtis, Morris & Safford
ATTORNEYS

INVENTORS
JULIAN ELLIS MACK
GEORGE W. STREANDER

United States Patent Office
2,938,385
Patented May 31, 1960

2,938,385

THERMISTOR THERMOMETER SYSTEM

Julian Ellis Mack, Shorewood Hills, and George W. Streander, Madison, Wis., assignors to Design, Incorporated, Madison, Wis., a corporation of Wisconsin Filed June 23, 1955, Ser. No. 517,552

4 Claims. (Cl. 73—362)

The present invention relates to the field of quick accurate temperature measurement and more particularly to thermistor thermometer systems which are extremely well adapted for clinical temperature measurements and also relates to improved compensated thermistor temperature sensing assemblies and sensitive rugged thermistor probes and protective coverings for thermometer bulbs.

The present invention is in the nature of an improvement on the Variable Resistance Thermometer System disclosed and claimed in the copending application of Lester V. Whitney, Serial No. 505,901, filed May 4, 1955.

Among the advantages of the described embodiments of the present invention are those resulting from the fact that they are fast in response, accurate, and rugged. These characteristics are particularly useful in pediatrics and veterinary work. The thermometer systems disclosed use thermistors as the temperature sensing elements and are very easy to calibrate and use. These systems use bridge circuits which are balanced at a point corresponding to a temperature somewhat outside of the desired range of measurement. Thus, in the measuring range as the measured temperature shifts progressively further from that corresponding to the null point, the bridge circuits become progressively further unbalanced. The resulting unbalanced current is sent through a meter connected into the bridge circuit and calibrated directly in degrees.

The thermistors described and used as the temperature sensing element have the advantage of a large change in resistance for only a few degrees change in temperature, thereby providing high sensitivity in the overall system. This method of using a slightly unbalanced bridge circuit which becomes more unbalanced is advantageous in reducing the amount of current drain from the standard voltage source used to energize the measuring circuit while at the same time obtaining the desired high sensitivity and accuracy, and is claimed in the above-identified copending Whitney application.

Advantageously, the null point of the bridge circuit is adjusted at the factory and during use it is only necessary to calibrate the system by periodically checking the voltage from the standard cell. For calibration, a fixed resistor is switched into the bridge circuit in place of the thermistor, so that calibration can readily be made regardless of the temperature of the thermistor itself. For example, for clinical work the null point of the systems is set at one side of the desired range, which extends from about 96° F. up through normal body temperature of about 98.6° F. to about 105° F. The null point of the systems described herein may advantageously be set at 96° F. and the calibration point at 101° F. or at 104° F.

The response time is of the order of 1 second when using the rugged and sensitive probes disclosed.

Among the difficulties overcome by the present invention is the fact that the manufacturing tolerance of the resistance value of thermistors is usually of the order of plus or minus 20% from the nominal value; however, the ratio between resistance values which occur with a given temperature change is usually substantially constant for certain types of thermistors within the narrow temperature range used for clinical temperature measurements. This large tolerance variation in thermistor resistance value has heretofore required that the bridge circuit be completely readjusted whenever it has been necessary to replace a thermistor element.

Among the advantages of the thermistor assemblies described herein are those resulting from the fact that they are compensated and they can readily be plugged into and unplugged from a bridge circuit. Replacement thermistor assemblies can be plugged into a bridge circuit without requiring any readjustment. The temperature measuring system and thermistor assemblies described herein provide all of the advantages of the high sensitivity and substantially constant ratio resistance changes we find in thermistors and yet enable complete interchangeability of thermistor assemblies and bridge circuits.

A further advantage of this bridge circuit is its extremely quick and easy calibration procedure to correct for voltage changes in the standard cell.

Moreover, the thermistor probes described provide a large heat conductivity directly to the thermistor itself while at the same time providing strong rugged protection for the delicate stem and leads to the thermistor. These thermistor probes can withstand substantial mechanical shock without breakage.

Another aspect of the present invention is the provision of removable sleeves of plastic material which can be readily sterilized and serve to prevent the transfer of germs on a thermometer bulb from one user to the next. Thus, the need to sterilize the probe itself between uses is removed.

The thermistor probes described are particularly suited to the use of such replaceable sanitary sleeves by the provision of at least one air passage extending longitudinally of the probe, thereby allowing any air trapped between the sleeve and sensitive end of the probe to escape. This removes any slight "lag" in reading time which might otherwise be caused by such a trapped air layer. As described, these passages are longitudinal grooves along the surface of the thermistor probe or other temperature bulb.

In this specification and in the accompanying drawings, are described and shown embodiments of our invention and various modifications thereof, but it is to be understood that these are not intended to be exhaustive nor limiting of the invention, but on the contrary are given for purposes of illustration in order that others skilled in the art may fully understand the invention and the manner of applying the invention in practical use, so that they may modify and adapt it in various forms, each as may be best suited to the conditions of a particular use.

The various objects, aspects, and advantages of the present invention will be more fully understood from a consideration of the following specification in conjunction with the accompanying drawings, in which:

Figure 1 is a schematic circuit diagram of an improved thermistor thermometer bridge circuit system embodying the present invention and including an interchangeable compensated thermistor assembly;

Figure 1A is a schematic circuit diagram of another embodiment of an interchangeable thermistor assembly for use with the remainder of the bridge circuit of Figure 1;

Figure 2 is a longitudinal cross sectional view of an improved thermistor probe shank portion and tip which is both sensitive and rugged;

Figure 3 is a longitudinal cross sectional view illustrating another embodiment of an improved thermistor probe shank portion and tip having extreme sensitivity and a protective cover against breakage;

Figure 4 is a longitudinal partial sectional view showing the use of a thin flexible removable sleeve on a thermometer bulb or probe;

Figure 4A is a cross sectional view taken along the line 4A—4A in Figure 4, looking to the left;

Figure 5 is a similar view of another type of sleeve; and

Figure 6:
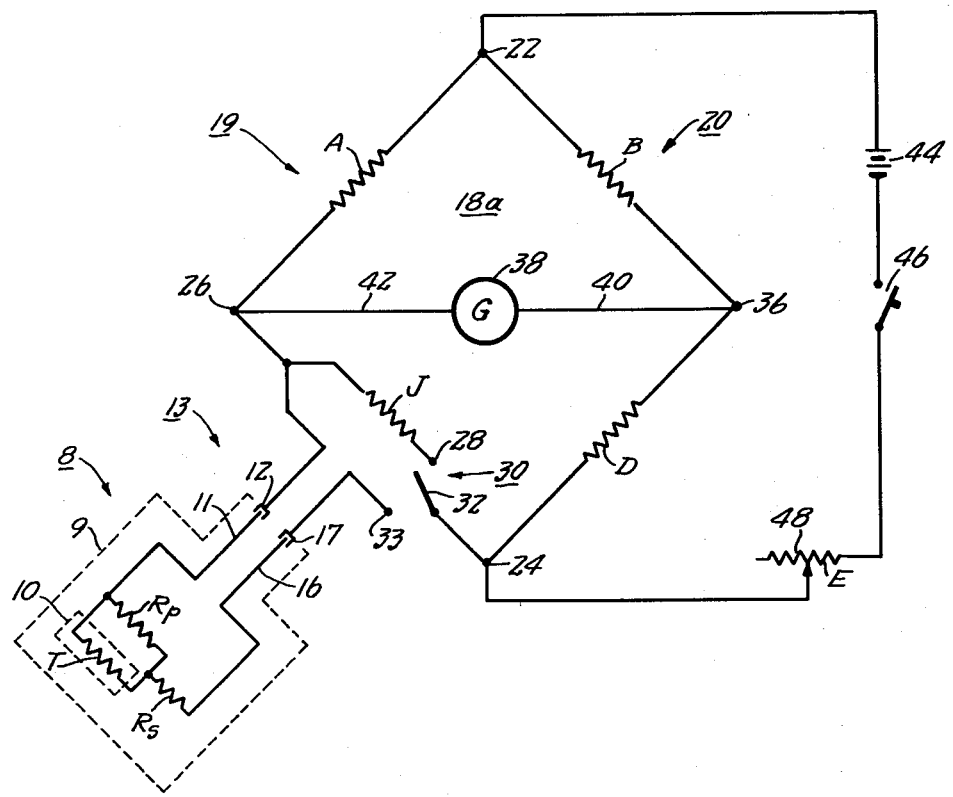
Figure 6 is a schematic circuit diagram of another thermistor thermometer bridge circuit system embodying the present invention.

The system shown in Figure 1 includes an interchangeable thermistor assembly, generally indicated within the dotted area 8, and including a thermistor temperature sensing probe tip, indicated within the dotted area 10, within which is the thermistor T itself. The probe tip 10 may advantageously be constructed in accordance with the features described below for high sensitivity combined with ruggedness. Associated with the probe tip 10 and forming part of the thermistor assembly 8 may be a series compensating resistor $R_s$ in series with T and a parallel compensating resistor $R_p$ in parallel with both $R_s$ and T. Both resistor $R_s$ and resistor $R_p$ may be included within the shank 9 of the thermistor probe at a distance from the sensitive tip 10. Also forming a part of the interchangeable thermistor assembly 8 is a compensating resistor N in circuit in series with a meter, as explained, and having one of its ends connected to the junction of the resistor $R_p$ and the thermistor T. The resistor N is shown located within the shank 9 of the thermistor probe, but it may also be located nearer the bridge circuit, as shown in Figure 1A, and described below.

Extending back from the shank 9 of the themistor probe itself and forming part of the interchangeable assembly 8 is a flexible lead 11 connected from one side of the thermistor T and from the resistor N to a contact 12 of a disconnectible plug and socket 13. From the other end of the resistor N a flexible lead 14 runs to a contact 15 in the disconnectible means 13, and a third flexible lead 16 runs from the opposite side of the series circuit including the thermistor T and resistor $R_s$ to a contact 17 in the disconnectible means 13. The leads 11, 14, and 16 are protected with a suitable flexible insulating covering, not shown, so that the thermistor probe can readily be moved about to measure temperature.

The disconnectible means makes connection into a bridge circuit 18 having first and second electrical arms, generally indicated at 19 and 20, respectively and each extending roughly down along opposite sides of the bridge circuit between first and second energizing terminals 22 and 24, respectively. Included within the first arm 19 is a resistor A in circuit in series with the thermistor T through the contact 12. The resistor A is connected between the first energizing terminal 22 and a first measuring terminal 26, with the thermistor T being in circuit in series between the first measuring terminal 26 and the second energizing terminal 24. Connected at one end to the terminal 26 is a calibrating resistor J arranged to be switched into circuit in the bridge 18. The resistor J has its other end connected to a terminal 28 of a double throw switch 30 having its contact arm 32 connected to the second energizing terminal 24. The other contact 33 of the switch 30 is connected to the plug contact 17.

Within the second bridge arm 20 is a resistor B connected to the first energizing terminal 22 and in series with a resistor D connected to the second energizing terminal 24. The junction 36 of resistors B and D comprises a second measuring terminal, with a galvanometer measuring instrument 38 which is arranged to read directly in degrees, having one of its terminals connected by a lead 40 to the terminal 36 and its other terminal connected by a lead 42 to the plug contact 15.

To energize the bridge circuit, an energizing circuit is coupled between the terminals 22 and 24. This energizing circuit includes a standard cell 44 in series with an on-off switch 46 and a variable resistor 48.

During measurement, the switch arm 32 is moved against the contact 33 into the "Read" position. This connects the thermistor T into the circuit, with the measuring instrument 38 in series with resistor N and effectively connected across the bridge between the measuring terminals 26 and 36.

This system is arranged to have its null point at 96° F., and its calibration point is set at 101° F.

For calibration the switch arm is merely moved into engagement with the contact 28 in "Calibrate" position with the resistor J electrically connected in the bridge circuit in place of the thermistor assembly 8, and the resistor 48 is adjusted to show a reading 101° F. on the meter 38. Because the thermistor is disconnected during calibration its temperature can be at any convenient value. This calibration step aligns the voltage actually applied to the terminals 22 and 24 to correct for any changes in the terminal voltage of the source 44 which may occur with time and use. They usually are so small that calibration need only occasionally be made.

As a specific example of the operation of this thermistor system it is assumed that a thermistor having a nominal resistance of 1200 ohms at 96° F. is used, e.g. Western Electric 14B or Veco 32A1. We find that these types of thermistors exhibit a substantially constant ratio between the resistance values which occur at the calibration point, "$T_1$," and the resistance values which occur at the null point "$T_0$." That is $T_1/T_0$ is constant, regardless of the actual resistance value $T_0$ at the null point due to tolerance variations. This ratio is almost exactly 11/12 for these thermistors, with $T_1$ at 101° F. The variation of resistance with temperature is very close to 3.6% per ° C. or 2.0% per ° F.

The bridge circuit is then set up in terms of the nominal values, and the compensation resistors $R_s$, $R_p$, and N, which take care of differences in the thermistors, enable complete interchangeability of bridge circuits 18 and thermistor assemblies 8.

The resistors A, B, D, and J are made of manganin or other material having practically a zero temperature coefficient of resistance. Where one or more of the resistors $R_s$, $R_p$, and N are used they also are of substantially zero temperature coefficient. The resistor N is usually used, and either the resistor $R_s$ or $R_p$ may be used to advantage under the conditions described in detail below. The respective resistance values A, B, and D of resistors A, B, and D are each chosen equal to the nominal null point resistance value of the types of thermistors used:

(1) $\quad A=B=D=T_{0n}$ (nominal value)

which is 1200 ohms each for the specific types of thermistors mentioned above, subscript "$n$" means nominal value.

The value of the calibration resistor J is made equal to the value of the resistance of a thermistor at the calibration point 101° F., which has an actual null point resistance equal to the nominal value.

(2) $\quad J=T_{1n}$ which is 1100 ohms for these specific types of thermistors with switch 30 in the calibrate position the resistance value E of the adjusting resistor 48 is set to give a meter reading of 101° F.

The voltage of the standard cell 44 is 1.25 volts.

When the null point resistance of the thermistor differs significantly from the nominal value of 1200 ohms, then one or the other of the following two formulas are used to determine the desired values of resistors $R_s$ and $R_p$.

When $T_0$ is less than $T_{0n}$ (nominal) then the series compensation resistor $R_s$ is used:

(3) $\quad R_s = D - T_0$, when $T_0 < T_{0n}$

When $T_0$ is more than $T_{0n}$ (nominal) then the parallel compensation resistor $R_p$ is used:

(4) $\quad R_p = \dfrac{D T_0}{T_0 - D}$, when $T_0 > T_{0n}$

The meter 38 may advantageously have a resistance value G of about 2,000 ohms and give a full scale deflection with 20 microamperes. Its scale is graduated from 96° F. to about 106° F. The compensating resistor N has a resistance value in the range from zero to about 40% of G, e.g. 0 to 800 ohms, depending upon the particular value of $T_0$. When $T_0$ has a minimum value, a corresponding low value of N is used in order to provide maximum effective meter sensitivity. For larger values of $T_0$, larger values of N are used to reduce the effective meter sensitivity and compensate for the larger absolute changes in thermistor resistance.

As shown in Figure 1A there are certain instances where the thermistor may be selected to have $T_0$ equal to the nominal value. In this case neither of the resistors $R_s$ nor $R_p$ is used. Another aspect of the thermistor assembly 8 shown in Figure 1A is the location of the sensitivity compensation resistor N adjacent the disconnecting means 13. Similarly, it will be understood that in the assembly 8 in Figure 1 the compensating resistor N may be adjacent the plug 13.

The thermistor probe shown in Figure 2 has a tip portion 10 and a shank portion 9 of which only that part near the tip is shown. The remainder of the shank 9 may conveniently be used to house the resistor $R_s$ or $R_p$, when either one or the other is required, and also to hold resistor N, unless resistor N is not required or is placed in or adjacent the disconnect plug 13. To give high sensitivity the thermistor element T (Western Electric 14B or Veco 32A1) is located within a silver thimble 50, which may advantageously have an O.D. of about 0.125 inch and a wall thickness of about 0.012 inch. The open end of the thimble is turned down to form a telescoping joint 52 with a stiff inert sleeve, shown as a stainless steel sleeve 54, e.g. formed from No. 304 tube having the same O.D. and wall thickness as the thimble. The joint 52 may be secured with tin solder.

The silver thimble advantageously provides a heat conductivity about 8 times that of the sleeve 54, concentrating the heating effect at T and reducing any heat loss through conductivity along the shank 9. For high heat conductivity between the thermistor T and the thimble 50 a layer 56 of indium-containing solder is used therebetween, which "wets" and firmly adheres to both the glass bead surrounding the thermistor and the thimble, e.g. Cerro De Pasco "Cerrolow 147" solder is very satisfactory for this. A rubber or plastic shock absorbing layer 58 may surround the glass stem 60 of the thermistor.

In Figure 3 is shown a probe wherein the bead of the thermistor T is directly exposed for maximum speed of response. Surrounding the stem 60 of the thermistor is a shock absorbing sleeve 62 of inert plastic resin, e.g. "Araldite 502" or "6060." For added strength an inert metal tube 64 is embedded in the sleeve 62 around the stem. We have satisfactorily used Monel or stainless steel tubing having an O.D. of .0937 inch and a wall thickness of 0.003 inch, and also with a wall thickness of 0.005 inch and an O.D. of 0.1875 inch spun down at the end to an I.D. of about 0.100 inch leaving only the sensitive end of the thermistor and a minimum of resin exposed, aside from the metal tube. In the latter case the resistors $R_s$ and $R_p$ were enclosed in the tube.

To avoid the need for sterilizing the thermistor probe 68 after each use, a removable flexible sleeve 70 (Fig. 4) may be used. This sleeve 70 can also be used with any type of thermometer bulb required to be sterilized in use. Preferably, this sleeve 70 is inert to the sterilizing agent so that it can be repeatedly sterilized without undue deterioration. As shown, the sleeve 70 is formed with a closed front end, for example, by pinching and heat sealing a short length of tubing. Polyethylene material may advantageously be used.

In order to bleed off all air from around the probe tip a plurality of air passages are provided extending longitudinally of the probe. In certain cases these may be internal passages, but as shown here, four longitudinal grooves 72 are used spaced 90° apart around the shank of the probe, as seen in Figure 4A, and extending almost to the end of the tip. These grooves are interconnected by a small groove 74 ringing the probe at a region spaced back from its tip. Thus, any "lag" in response due to trapped air is eliminated.

A modified form of sleeve 76 is shown in Figure 5. This comprises a length of tubing which is closed off at the front end by folding back along the surface of the sleeve. If desired this sleeve 76 may be of more inexpensive plastic or rubber materials which can economically be discarded after one use.

The bridge circuit 18$a$ of Figure 6 is a preferred embodiment generally similar to the circuit 18 shown in Figures 1 and 1A, except as follows. The measuring means 38, shown here as a galvanometer, is directly connected between the measuring terminals 36 and 26 by means of the leads 40 and 42, respectively. Also, in the shank portion 9 of the interchangeable thermistor assembly 8, the parallel compensating resistor $R_p$, when used, is in parallel with the thermistor T with the series compensating resistor $R_s$, when used, being placed, as shown, in series with this parallel combination of T and $R_p$.

This circuit has its null point at 96° F. like the circuits of Figures 1 and 1A but has its calibration point at 104° F.

With this circuit arrangement and assuming that the resistance value B is made equal to A, then the current I through the galvanometer at any temperature can be found by substituting the actual values indicated into the following equation:

(4A)
$$I = \dfrac{A(D-J)V}{J(A^2 + 2AD + AG + DG) + A(AD + AG + DG)}$$

As a specific example of the operation of this clinical thermistor temperature measuring system, shown in Figure 6, it is assumed that a thermistor type, as mentioned above, is used, having a nominal resistance of 1200 ohms at 96° F. The function of $R_s$ and $R_p$ is to correct for the individual thermistor resistance values, which differ widely from this nominal value. In this bridge circuit 18$a$, as in circuit 18, resistors A and B are given equal resistance values.

The values of A and B are chosen desirably to give the maximum galvanometer current I with respect to A. That is, Equation 4A is differentiated with respect to A, all other values being considered fixed, giving the following expression:

(5) $\quad A = \sqrt{JDG/(J+D+G)}$

Using the preferred values of J, D, and G set forth below gives a value of $A = 857$ ohms at 96° F., and 806 ohms at 106° F. This is conveniently rounded off to a value of:

(5A) $\quad A = B = 800$ ohms

The nominal null point resistance of these thermistors is as before:

(5B) $\quad T_{0n} = 1200$ (nominal)

The resistance value D of the resistor D in circuit 18a is made a convenient value somewhat larger than $T_{0n}$ but generally less than 20% larger. For example, D may be in the range from about 5% to about 20% larger than $T_{0n}$, depending upon the tolerance variations from the desired nominal resistance value at the null point which are to be accommodated in the actual null point resistance value $T_0$, and also depending upon the desired accuracy. The larger the difference between D and $T_{0n}$ the larger the $T_0$ variations which can be accommodated, but this wider accommodation is obtained at some sacrifice in accuracy. For best overall results in most cases an increase of about 8.4% works very well, e.g. here D is made equal to 1300 ohms, which is the total resistance value provided between the plug contact terminals 12 and 17 at the null temperature by a proper selection of $R_p$ and $R_s$:

(6) $$D = \frac{T_0 R_p}{T_0 + R_p} + R_s$$

where $T_0$ is the actual resistance value of a thermistor at the null point and $R_p$ and $R_s$ are the corresponding values of the parallel and series compensating resistors.

The resistance value J of the resistor J in circuit 18a is made 1140 ohms. J is equal to the resistance value between the plug contact terminals 12 and 17 at the calibration temperature point of 104° F.:

(7) $$J = \frac{T_2 R_p}{T_2 + R_p} + R_s$$

where $T_2$ is the resistance value of this same thermistor at this higher calibration point of 104° F. and $R_p$ and $R_s$ are, as before, the corresponding compensation resistance values. J is used for calibration of the voltage source 44 as in circuit 18, by throwing the switch 30 to calibrate position and adjusting the value E of resistor 48 until the meter 38 indicates the desired value; here it is 104° F. During calibration the actual temperature of T may be anything convenient.

For calculating the desired value of $R_p$ and $R_s$ to use with any particular thermistor having an actual null point resistance value $T_0$, which may differ as much as 20% or so from the nominal value $T_{0n}$ and having an actual calibration point value of $T_2$, which may differ by 20% or so from the nominal value $T_{2n}$, the following formula is used:

(8) $$R_p = \frac{Q\Sigma + \sqrt{Q^2\Sigma^2 + 4(\Delta - Q)Q\pi}}{2(\Delta - Q)}$$

where:

(9) $Q = D - J$ (e.g. 1300 — 1140)

(10) $\Sigma = T_0 + T_2$

(11) $\Delta = T_0 - T_2$

The value of $R_s$ is calculated from a transposition of Equation 6

(12) $$R_s = D - \frac{T_0 R_p}{T_0 + R_p}$$

$R_s$ can equally well be calculated from a transposition of Equation 7:

(13) $$R_s = J - \frac{T_2 R_p}{T_2 + R_p}$$

For example, using Equation 8 and either 12 or 13 for three thermistors having actual null point resistance values, $T_0$, as given, the corresponding $R_p$ and $R_s$ in ohms are as follows, resulting in a scale reading in degree F. which, in each case, deviates only a very slight amount from the true value over the desired clinical range:

| $T_0$ | $R_s$ | $R_p$ | 96° | 101° | 104° | 106° |
|---|---|---|---|---|---|---|
| 1,082 | 150,000 | 226 | 96 | 101.02 | 104.00 | 105.95 |
| 1,250 | 14,100 | 151 | 96 | 101.00 | 104.00 | 106.00 |
| 1,400 | 9,060 | 87 | 96 | 100.98 | 104.00 | 106.02 |

In this circuit 18a, the measuring means 38 has a resistance value G of 2,000 ohms and a 20 microampere full scale deflection current, with $V = 1.28$ volts.

With this arrangement it is seen that wide tolerance variations in $T_0$ are very readily and strikingly accurately corrected so as to give temperature readings for clinical purposes which are accurate to the fourth or fifth figure and require only about 1 second to make. The only practical limits on $T_0$ are that it cannot be such a high value that the calculated value of $R_s$ is negative. It cannot be so low that Q is larger than $\Delta$.

From the foregoing it will be understood that the embodiments of the present invention described above are well suited to provide the advantages set forth, and since many possible embodiments may be made of the various features of this invention and as the apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, or without departing from the scope of the invention.

What is claimed is:

1. A clinical thermistor thermometer bridge circuit for quickly and accurately measuring temperatures within the clinical range from about 96° F. to about 106° F. and including first and second energizing terminals; a first electrical arm between said energizing terminals and including: a first resistor having a relatively fixed resistance value A, a thermistor having a predetermined nominal resistance value $T_{0n}$ with a tolerance better than 20% at a temperature of about 96° F., a first measuring terminal in circuit intermediate said first resistor and thermistor, a second resistor in parallel with said thermistor, and a third resistor in series with said parallel combination, circuit means connecting said thermistor and second and third resistors in circuit between the second energizing and the first measuring terminals, a second electrical arm between said energizing terminals and including: a fourth resistor having a relatively fixed resistance value B, a fifth resistor having a relatively fixed resistance value D, and a second measuring terminal in circuit intermediate said fourth and fifth resistors with said fifth resistor being in circuit between the second energizing and second measuring terminals; and measuring means coupled between said measuring terminals; A being approximately equal to B, both A and B being approximately two-thirds of $T_{0n}$, D being about 8% larger than $T_{0n}$, and the resistance of said third resistor plus the resistance of the parallel combination of the thermistor and of the second resistor at about 96° being equal to D, whereby high sensitivity and accuracy are obtained throughout said range regardless of the actual resistance value of the thermistor at about 96° F.

2. A clinical thermistor thermometer as claimed in claim 1 and wherein said circuit means includes a switch having first and second conditions and in its first condition connecting said thermistor and second and third resistors between the second energizing and first measuring terminals, a sixth resistor having a resistance value J, said switch in its second condition connecting said sixth resistor between said latter terminals and disconnecting said thermistor and second and third resistors, the value of J being equal to the resistance of said third resistor plus the resistance of the parallel combination of the thermistor and of the second resistor at a temperature within said range and of at least 101° F.

3. A clinical thermistor thermometer bridge circuit for quickly and accurately measuring temperature within the range from about 96° F. to about 106° F. including first and second energizing terminals and first and second measuring terminals, a first resistor having a resistance value A in circuit between said first energizing and first measuring terminals, a second resistor having a resistance value J and a thermistor of a type having a nominal resistance value $T_{0n}$ at a first predetermined temperature just below said range said type having a tolerance of a predetermined amount, and switch means in circuit between said first measuring and second energizing terminals, said thermistor having an actual resistance value $T_0$ at said first predetermined temperature, a third resistor having a resistance value B in circuit between said first energizing and second measuring terminals, a fourth resistor having a resistance value D in circuit between said second measuring terminal and said second energizing terminal, A and B being approximately equal and less than $T_{0n}$, D being greater than $T_{0n}$ by about one-half of said predetermined amount, J being equal to the average resistance value of said type at a second predetermined temperature within said range, $T_2$ being the actual resistance of said thermistor at said second predetermined temperature, a compensating resistor having a resistance value $R_s$, in series with said thermistor and a compensating resistor having a resistance value $R_p$ in parallel with said thermistor, $R_p$, and $R_s$, being equal to the following values:

$$R_p = \frac{Q\Sigma\sqrt{Q^2\Sigma^2 + 4(\Delta - Q)Q\pi}}{2(\Delta - Q)}$$

where $Q = D - J$, $\Sigma = T_0 + T_2$, and $\Delta = T_0 - T_2$, and $$R_s = D - \frac{T_0 R_p}{T_0 + R_p}$$

said switch means having first and second positions and when in said first position connecting said thermistor and said two compensating resistors in circuit between said first measuring terminal and said second energizing terminal and when in said second position opening said latter circuit and connecting said second resistor J between said first measuring terminal and said second energizing terminal.

4. A clinical thermistor thermometer bridge circuit for quickly and accurately measuring temperatures over the range from about 96° F. to about 106° F., including first and second energizing terminals, a first electrical arm between said first and second terminals including, respectively, a first resistor having a resistance value A, a thermistor of a class having an average resistance value $T_{0n}$ at a first predetermined temperature just below said range, the actual resistance value $T_0$ being less than $T_{0n}$ and greater than 80% of $T_{0n}$, switch means in said first arm and having first and second positions, and a first measuring terminal in circuit in said first arm intermediate said first resistor and said thermistor; a second electrical arm between said first and second energizing terminals including, respectively, a second resistor having a resistance value B, a third resistor having a resistance value D, and a second measuring terminal in said second arm intermediate said second and third resistors; unbalance measuring means in circuit between said first and second measuring terminals, A, B, D, and $T_{0n}$ being approximately equal; a fourth resistor in series with said thermistor and having a resistance value equal to the difference between D and $T_0$, said switch means when in said first position connecting said thermistor and said fourth resistor in series between said first measuring terminal and said second energizing terminal, and a fifth resistor having a resistance value J equal to the average resistance value of a thermistor of said class at a temperature of approximately 101° F. connected to said switch means, said switch means when in said second position connecting said fifth resistor between said first measuring terminal and said second energizing terminal.

References Cited in the file of this patent

UNITED STATES PATENTS

| 2,012,112 | States | Aug. 20, 1935 |
| 2,016,660 | Weeks | Oct. 8, 1935 |
| 2,195,019 | Bloomheart | Mar. 26, 1940 |
| 2,321,846 | Obermaier | June 15, 1943 |
| 2,606,986 | Sweger | Aug. 12, 1952 |
| 2,728,833 | Dickey | Dec. 27, 1955 |
| 2,711,650 | Weisheit | June 28, 1955 |
| 2,799,758 | Hutchins | July 16, 1957 |

FOREIGN PATENTS

| 597,420 | Great Britain | Jan. 26, 1948 |

OTHER REFERENCES

Article: A Device for Obtaining the Continuous Record of Body Temperatures, by Williams et al., in Science, vol. 10, July 1948.

Article: Portable Precision Resistance Thermometer by Hall, published in Journal of Scientific Instruments, vol. 26, No. 12, pages 392–396.

Article: "A Method for Constructing Direct Reading Thermistor Thermometer," by McLean, in Journal of Scientific Instruments, vol. 31, December 1954, pages 455–57.